Nov. 15, 1949 A. REUTER ET AL 2,488,066
HYDRAULIC HAY RACK ON A VEHICLE
Filed May 17, 1948 3 Sheets-Sheet 1

Inventors
Alfred Reuter
Richard Reuter

By Clarence A. O'Brien
and Harvey B. Jacobson
Attorneys

Inventors
Alfred Reuter
Richard Reuter

Nov. 15, 1949   A. REUTER ET AL   2,488,066
HYDRAULIC HAY RACK ON A VEHICLE
Filed May 17, 1948   3 Sheets-Sheet 3

Inventors
Alfred Reuter
Richard Reuter

By Clarence A. O'Brien
and Harvey B. Jacobson
Attorneys

Patented Nov. 15, 1949

2,488,066

UNITED STATES PATENT OFFICE 2,488,066

HYDRAULIC HAYRACK ON A VEHICLE

Alfred Reuter and Richard Reuter, Mazeppa, Minn.

Application May 17, 1948, Serial No. 27,446

5 Claims. (Cl. 214—83.34)

1

This invention relates to a hay rack and has for its primary object to facilitate the loading of the rack by providing means for distributing the hay as it is loaded from a hay loader onto the rear of the rack.

Another important object of this invention is to provide a compact and durable hay rack, which comprises a fixed body section and a movable body section, the latter section being easily and conveniently moved into collapsed relation with the fixed section, responsive to actuating means.

Yet another important object of this invention is to provide an adjustable hay rack, which is adaptable for use as a bundle wagon or draft vehicle and which is provided with means for adjusting the length thereof.

A meritorious feature of this invention resides in the provision of a frame on one end of which is mounted a fixed body section, guide rails extending longitudinally on the frame and provided to slidably receive a movable section, which is adapted to move in and out of the fixed section into a collapsed relation therewith.

Another important feature of this invention resides in the provision of hydraulically actuated means for moving the movable section into and out of collapsed relation with the fixed section.

Still another important feature of this invention resides in the provision of a cylinder mounted on the bottom portion of the frame and extending longitudinally thereon, a common push rod being slidably disposed in the cylinder and having its opposite extending ends operatively connected to opposite ends of the movable section, so that the pressure responsive push rod is movable longitudinally on the frame to move the movable section in a corresponding path of travel.

These and ancillary objects and other meritorious features are attained by this invention, a preferred embodiment of which is set forth in the following description and illustrated in the accompanying drawings, wherein—

2

Figure 6:
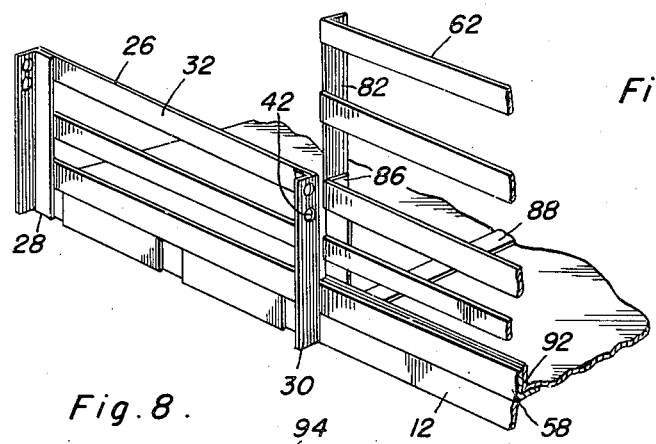
Figure 8:
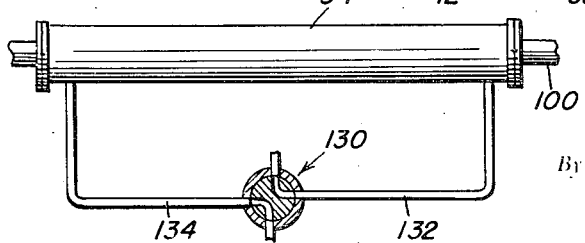
Figure 7:
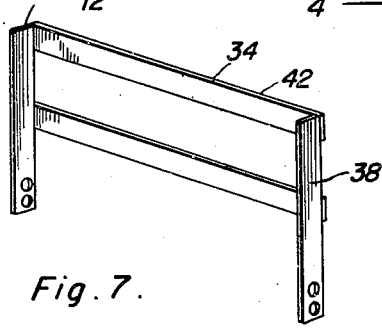

Figure 6 is an enlarged fragmentary view, showing the top section of the side or the fixed body section removed, when the device is used as a bundle wagon;

Figure 7 is a view in perspective of the removable top section, and;

Figure 8 is a diagrammatic view of valve means provided in the fluid lines for conducting the fluid pressure to the desired end of the cylinder, in order to move the push rod in the desired direction.

Referring now more particularly to the drawings, wherein similar characters of reference designate corresponding parts throughout, this invention generally designated by the character reference 10 comprises a rectangular frame 12, which is formed of longitudinal angle irons or the like, joined at their opposite ends by transverse angle irons. Extending longitudinally within the outer rectangular framework are a pair of longitudinal bars 14 and 16. Transverse brace bars 18 and 20 are secured between the longitudinal bars and the opposed longitudinal sides.

Figure 1:
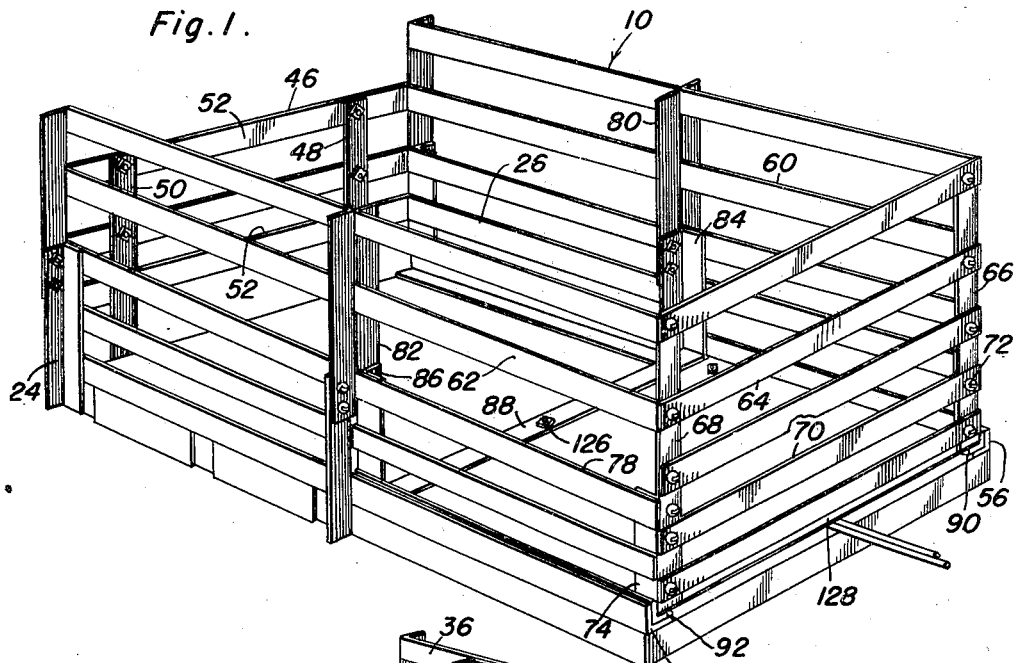
Figure 1 is a view in perspective of this invention, showing the same in an extended position.
Figure 2:
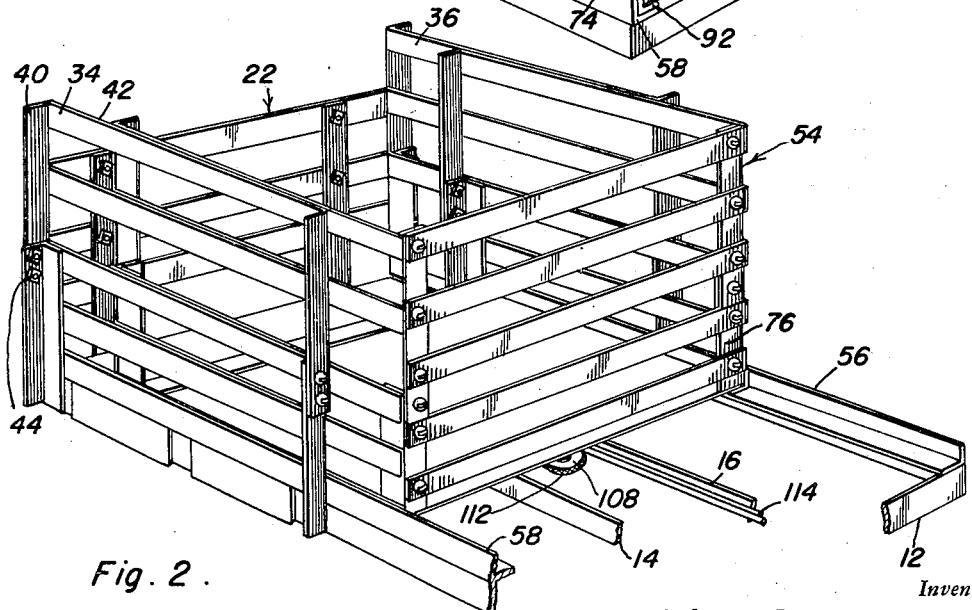
Figure 2 is a similar view in perspective, illustrating the sectional body in a collapsed relation.

Suitably mounted on one end of the rectangular frame is a fixed body section 22. The body section 22 comprises a pair of fixed lower sides 24 and 26. The sides 24 and 26 consist of a pair of vertical angle irons 28 and 30 which are secured to the sides of the rectangular frame. A plurality of transverse slats 32 are connected between the extending angle irons as shown in Figure 6 of the drawings. Detachable and adjustable sides 34 and 36 are carried by the fixed sides 26 and 24, the detachable and adjustable sides comprising a pair of vertical standards 38 and 40, between which are joined a plurality of connecting slats 42. The lower portions of the standards are suitably apertured for attachment to the vertical angle irons 28 and 30, the angle irons having vertically spaced attaching apertures 42 disposed therein. Of course, any suitable securing means may be provided to attach the standards to the angle irons and may include a bolt assembly 44, as shown in Figures 1 and 2 of the drawings.

The end 46 of the fixed section comprises a pair of standards 48 and 50, having a series of vertically spaced apertures therein for the purpose of attaching transverse slats 52 in a connecting placement between the standards. The standards 48 and 50 are bolted to the end of the rectangular frame or otherwise detachably secured, so that the height of the end section 46 may be easily and conveniently adjusted or the same may be completely removed.

Adapted for movement into and out of the fixed section 22 is a movable section 54. The movable section 54 is moved into and out of a collapsed relation with the fixed section, the same travelling on longitudinally extending guide means. The guide means comprising a pair of angle irons 56 and 58, which are mounted on the upper surface of the opposed sides of the outer rectangular frame, as shown in Figure 2 of the drawings.

The movable section 54 comprises a pair of opposed sides 60 and 62, joined at their outer ends by a fixed end section 64. The end section 64 comprises a pair of vertical standards 66 and 68, which are connected by a plurality of transverse slats or bars 70 by suitable securing means 72. The lower ends of the standards are reinforced by angle irons 74 and 76, to the outer surface of which are suitably secured by welding or the like a number of outwardly projecting side slats or bars 78. Of course, the outwardly extending side slats 78 are secured to the upper portion of the standards 66 and 68 by any suitable means so as to extend parallel with the lower slats extending from the angle irons 74 and 76. A pair of vertical standards 80 and 82 are secured at their lower ends to angle irons 84 and 86, the standards and angle irons having secured thereto the opposite end of the side slats 78. The angle irons 86 and 84 are secured to a transverse bar 88, which serves to rigidify or brace the sides 60 and 62 of the movable section. Complementary angle irons or rails 90 and 92 are secured to the movable section and are adapted to move in the guide rails 56 and 58, as seen in Figure 2.

Figure 3:
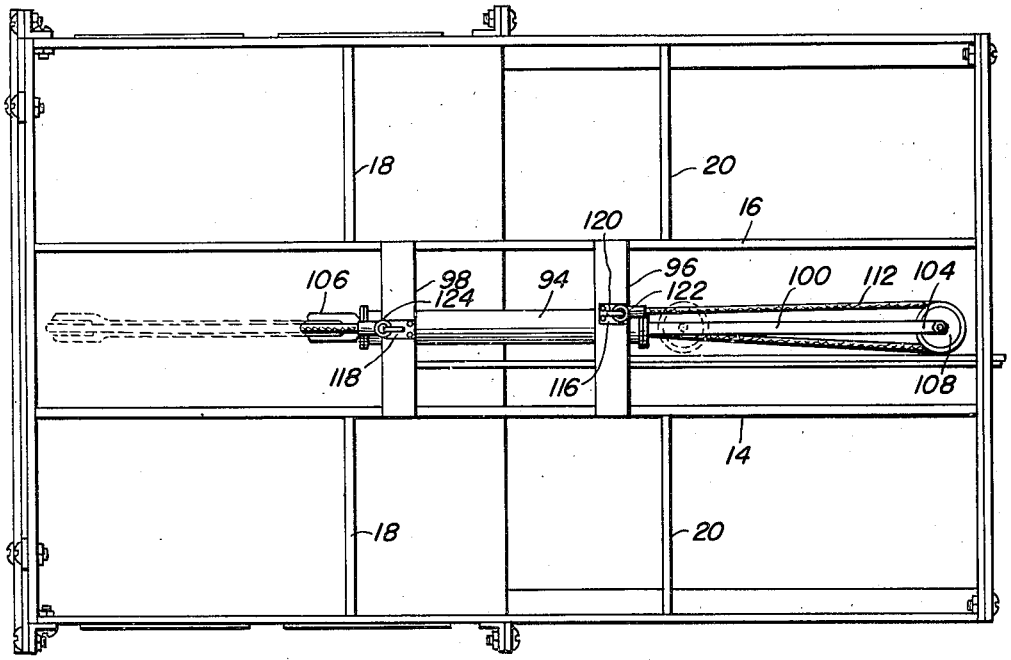
Figure 3 is a bottom plan view of this invention, showing the means provided for actuating the movable section into and out of collapsed relation with the fixed section.
Figure 4:
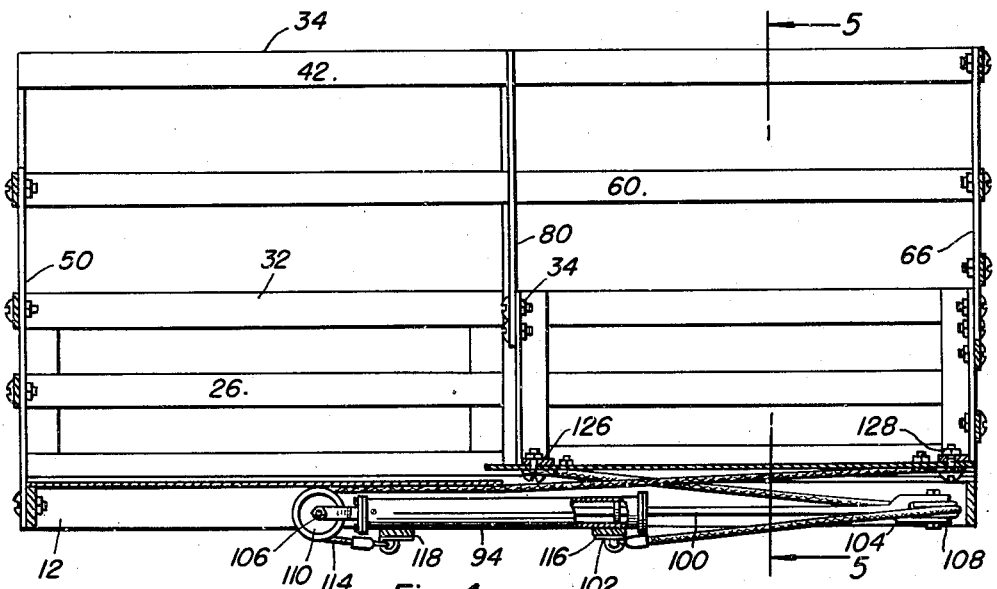
Figure 4 is a longitudinal vertical sectional view taken substantially on the plane of lines 4—4 of Figure 5.
Figure 5:
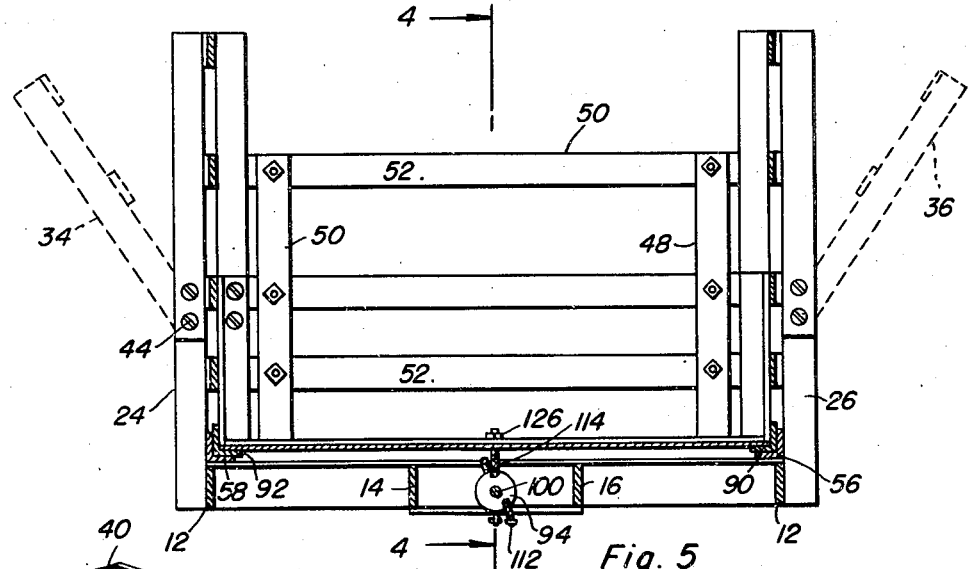
Figure 5 is a sectional view taken substantially on the plane of line 5—5 of Figure 4.

Suitable means is provided for moving the movable section into various relations with the fixed section, the extreme positions being shown in Figures 1 and 2 of the drawings. The means preferably comprises a hydraulically actuated means, which is adaptable to engage the opposite or closed and open ends of the movable section. The means preferred structurally comprises a cylinder 94, which is suitably mounted on a pair of transverse supporting bars 96 and 98, which extend between the longitudinal bars 16 and 14, as seen in Figure 3 of the drawings. The cylinder 94 is longitudinally disposed on the supporting bars and is centrally located between the rectangular outer frame. A piston or a push rod 100 is slidably received within the cylinder 94, a piston 102 being disposed on the medial portion of the rod 100. The push rod 100 terminates in yoke ends 104 and 106, the yoke end 104 being preferably disposed in a horizontal plane, while the yoke end 106 is disposed in a vertical plane, as seen in Figure 3. Sheaves or pulleys 108 and 110 are journalled in the yoke ends. Flexible connecting means, 112 and 114, such as cables or the like, are provided to transmit the hydraulic actuating pressure to move the movable section on the guide rails. Of course, it is to be apparent that any means may be provided and it is to be understood that this invention includes a structure wherein the piston rod ends are directly connected or attached to the movable section, so that a transmitting system is not needed. However, for a purpose of illustration, the flexible connecting means 112 and 114 are illustrated, one end of the cables 112 and 114 being secured to the transverse bars 96 and 98. Suitably attached to the under surface of the bars 96 and 98 in parallel relationship are a pair of brackets 116 and 118, the same having similar depending integral hooks 120. Hook ends 122 and 124 of the cables are disposed within the depending hooks 120, as seen in Figure 3. The cable 112 is trained over the sheave 108 and is joined to the rear end or open end of the movable section by means of a bolt assembly 126, as seen in Figure 4 of the drawings. The cable 114 is trained over the sheave 110 and is secured by a bolt assembly or the like 128 to the forward or closed end of the movable section.

Suitable valve means 130, drawn diagrammatically in Figure 8 of the drawings, is provided to enable the desired forward or rearward movement of the push rod to be achieved. The valve 130 is preferably a two-way valve from which extend in opposite directions fluid conducting lines 132 and 134, the line 132 being disposed or inserted in the forward portion of the cylinder, while the line 134 is disposed in the rear portion of the cylinder. Thus, pressure transmitted through the line 132 enters the cylinder 94 at the forward end and moves the push rod 109 rearwardly to move the movable section into collapsed placement or position as shown in Figure 2. In a similar manner, fluid pressure from the line 134 entering into the rear portion of the cylinder moves the movable section outwardly to an extended placement, as seen in Figure 1 of the drawings.

Of course, a suitable bottom structure is provided and may comprise a suitable type of material, such as wood, metal or the like, which is suitably secured to the opposed sides and end of the respective sections.

In operation, the hay rack or draft wagon, which may be made of wood or metal or the like is moved into the operation locale in a collapsed position, as seen in Figure 2. As the hay or like material comes from the hay loader at the collapsed rack, the movable section is extended from the fixed section to distribute the hay. Of course, the same operation may be employed when the rack is used as a bundle wagon for hauling grain bundles during the threshing season, the sides 34 and 36 being removed during this operation.

Thus, it can be seen that there is provided a convenient, compact and durable adjustable hay rack or draft wagon, which responsive to hydraulic actuation is employable in various road receptive positions, without necessity of moving the rotatably mounted frame with respect to the hay loader.

However, since many other purposes and objects of this invention will become apparent to those skilled in the art, upon a perusal of the foregoing description, in view of the accompanying drawings, it is found that certain changes, not amounting to invention may be effected thereon, as coming within the spirit of the invention and the scope of the appended claims.

Having described the invention, what is claimed as new is:

1. A draft vehicle comprising a rectangular frame, a fixed body section mounted on one end of the frame, longitudinal guide rails disposed on opposite sides of the frame, a movable body section slidably disposed on the guide rails, a double acting cylinder centrally mounted on the frame beneath the body sections, a common push rod operatively disposed in the cylinder, sheaves journalled on the opposite ends of the push rod, flexible connecting means trained over the sheaves and secured at opposite ends to the frame and to the movable section for moving the movable section into and out of collapsed relation with the fixed section responsive to selective movement of the push rod.

2. The combination of claim 1, wherein said cylinder is longitudinally disposed in the frame, a piston medially disposed on the push rod and slidably received in the cylinder, valve means for selectively moving the piston toward opposite ends of the cylinder responsive to hydraulic actuation.

3. The combination of claim 1, wherein said flexible connecting means includes cables secured to the central portion of the frame, said cables being trained over the sheaves and secured to opposite ends of the movable section.

4. The combination of claim 1, wherein the sides and end of said fixed section are adjustable and detachable.

5. A draft vehicle comprising a rectangular frame, a fixed body section mounted on one end of the frame, said fixed body section having hinged sides, an adjustable end and an open end, longitudinally extending guide rails disposed on opposite sides of the frame, a movable body section slidably mounted on the guide rails for movement through the open end of the fixed section into and out of collapsed relation therewith, a double acting cylinder mounted on the frame, a push rod operatively disposed in the cylinder and means operatively connected with the push rod and body sections for selectively moving the movable section into and out of collapsed relation with the fixed section.

ALFRED REUTER.
RICHARD REUTER.

REFERENCES CITED

The following references are of record in the file of this patent:

UNITED STATES PATENTS

| Number | Name | Date |
| --- | --- | --- |
| 981,268 | Hurd | Jan. 10, 1911 |
| 1,003,010 | Shafer | Sept. 12, 1911 |
| 1,098,658 | Bates | June 2, 1914 |
| 1,199,142 | Wurtz | Sept. 26, 1916 |
| 2,318,886 | Paiement | May 11, 1943 |